(12) United States Patent
Hamlin et al.

(10) Patent No.: US 11,470,120 B2
(45) Date of Patent: Oct. 11, 2022

(54) PROVIDING DIFFERENT LEVELS OF RESOURCE ACCESS TO A COMPUTING DEVICE THAT IS CONNECTED TO A DOCK

(71) Applicant: Dell Products L. P., Round Rock, TX (US)

(72) Inventors: Daniel L. Hamlin, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 395 days.

(21) Appl. No.: 16/356,671

(22) Filed: Mar. 18, 2019

(65) Prior Publication Data
US 2020/0304543 A1    Sep. 24, 2020

(51) Int. Cl.
H04L 9/40        (2022.01)

(52) U.S. Cl.
CPC .......... *H04L 63/20* (2013.01); *H04L 63/0823* (2013.01); *H04L 63/0876* (2013.01); *H04L 63/102* (2013.01); *H04L 63/108* (2013.01)

(58) Field of Classification Search
CPC ... H04L 63/20; H04L 63/0876; H04L 63/108; H04L 63/0823; H04L 63/102; G06F 21/85
See application file for complete search history.

(56) References Cited

U.S. PATENT DOCUMENTS

| | | | | |
|---|---|---|---|---|
| 8,590,060 | B2* | 11/2013 | Walkes | G06F 21/85 726/34 |
| 9,077,756 | B1* | 7/2015 | FitzGerald | H04L 63/20 |
| 10,494,205 | B1* | 12/2019 | Hoofard | H04L 9/3231 |
| 2015/0036641 | A1* | 2/2015 | Eichen | H04M 7/0075 370/329 |
| 2021/0082220 | A1* | 3/2021 | Boerger | B65G 67/02 |

OTHER PUBLICATIONS

Wikipedia, "Network Access Control", Captured from Internet on Feb. 17, 2019, 5 pgs.
Wikipedia, "Active Directory", Captured from Internet on Mar. 8, 2019, 17 pgs.
Wikipedia, "Lightweight Directory Access Protocol", Captured from Internet Mar. 13, 2019, 14 pgs.
Detwiler, "Disable USB Ports To Prevent Unauthorized Data Transfers", Tech Republic, Jan. 16, 2003, 2 pgs.
Twitter, "Disabling USB Ports: 4 Ways To Prevent Data Leaks Via USB Devices", Fed Tech, Jul. 7, 2017, 3 pgs.
Intel Corp., "Thunderbolt 3 and Security on Microsoft Windows 10 Operating System", Sep. 2018, 3 pgs.

* cited by examiner

*Primary Examiner* — Khoi V Le
(74) *Attorney, Agent, or Firm* — Egan, Enders & Huston LLP.

(57) ABSTRACT

In some examples, a dock may determine that computing device is connected to the dock. The dock may authenticate the computing device, a user of the computing device, or both. The dock may select a policy based on the type (e.g., provided by a corporation or by the user) of the computing device, the type of user (e.g., employee, contractor, or visitor), or both. The dock may configure the dock to enforce the policy. For example, for one or more of the ports of the dock, the dock may enable a port, disable the port, monitor data sent and received using the port, restrict an upload and/or download speed of the port, prevent the port from accessing one or more locations (e.g., addresses or paths), or any combination thereof.

26 Claims, 4 Drawing Sheets

PROVIDING DIFFERENT LEVELS OF RESOURCE ACCESS TO A COMPUTING DEVICE THAT IS CONNECTED TO A DOCK

BACKGROUND OF THE INVENTION

Field of the Invention

This invention relates generally to a docking station ("dock") associated with a computing device and, more particularly to providing different users (e.g., fulltime, employee, contractor, guest, and the like) with different levels of access to a dock and associated resources.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many companies allow employees to work from home. In addition, many companies have multiple locations in a particular country and/or around the world. At a particular location, a company may provide visitor workspaces that enable employees that normally work from home or work at a different location to work at the particular location. The workspaces may be accessible to non-employees, such as, for example, contractors, visitors, and the like and may each include a dock. The dock may provide a laptop (or other computing device) that is connected to the dock with access to various resources (e.g., power supply, printer, keyboard, mouse, and the like) connected to the dock via one or more ports. If the dock has an ethernet port, a user that connects the laptop to the dock may be able to access networked resources, including confidential information. Thus, providing a dock in a visitor workspace can create a security issue because a visitor can dock a device (e.g., laptop, tablet, or the like), access and download confidential information, upload malicious software, and the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a dock may determine that computing device is connected to the dock. The dock may authenticate the computing device, a user of the computing device, or both. The dock may select a policy based on the type (e.g., provided by a corporation or by the user) of the computing device, the type of user (e.g., employee, contractor, or visitor), or both. The dock may configure the dock to enforce the policy. For example, for one or more of the ports of the dock, the dock may enable a port, disable the port, monitor data sent and received using the port, restrict an upload and/or download speed of the port, prevent the port from accessing one or more locations (e.g., addresses or paths), or any combination thereof.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a docking station ("dock") to, when a computing device is connected ("docked") to the dock, apply a policy to provide a particular level of access to individual resources that are accessible via the dock. For example, when a dock detects that a computing device has been connected to the dock, the dock may authenticate the computing device, authenticate a user associated with the computing device, or both. The dock may apply a policy to provide (or deny) access to one or more resources (e.g., input device(s), display device(s), printer(s), network(s), and the like) that are accessible via the dock.

The dock may detect that a computing device has been connected to the dock. In response, the dock may determine an age (e.g., or a creation date) associated with a set of policies stored in a memory of the dock. The policies may specify a level of access to provide a computing device, a user associated with the computing device, or both. If the age (or the creation date) of the policies stored in the dock satisfies a predetermined threshold (e.g., less than N days old, where N>0, such as, for example, N=1, 7, 30, or the like) then the dock may use the stored policies. If the age of the policies does not satisfy the predetermined threshold, then the dock may determine if a policy server is accessible, e.g., determine whether a networking (e.g., Ethernet) port of the dock is connected via a network to a policy server. If the policy server is accessible, the dock may query the server as to whether updated policies are available. The server may send the dock updated policies if the updated policies are available. If updated policies are unavailable, then the server may instruct the dock to use the policies currently stored on the dock. If the policy server is inaccessible, the dock may use a default policy. For example, the default policy may be a last used policy, a default device policy, a default user policy, or the like.

Based on the policy, the dock may authenticate (i) the computing device, (ii) a user associated with the computing device, or both (i) and (ii). For example, in a "bring your own device" environment, a particular policy may be selected based on authenticating a user and determining a status (e.g., employee, contractor, visitor, or the like) of the user. To illustrate, an employee may be provided full access to all available resources, a contractor may be provided partial access to resources (e.g., the contractor may be able to access particular locations on servers but not all locations on all servers), and a visitor may be provided with access to local resources (e.g., power, printer, input devices, output devices) but denied access to networked resources. In an environment where corporate devices are provided access to particular resources (e.g., corporate network and networked resources), a particular policy may be selected based on whether the device comprises a corporate device. For example, a corporate device may include a device with a device identifier that has been registered with the corporation, a device on which a corporate security application has been installed, or the like. If the authentication is successful, then the dock may provide the computing device that is connected to the dock with access to one or more resources based on the policy. For example, the resources that are accessible via the dock may include (i) local resources, such as power, printer, input device, output device, or the like, (ii) external resources (e.g., network accessible resources) such as a corporate network (e.g., intranet), corporate servers, or (iii) any combination thereof. Of course, device authentication and user authentication may be combined. For example, after a user is authenticated and the device is authenticated, if the dock determines that an employee has connected a corporate device to the dock, then the employee may receive a particular (e.g., highest) access level while if the employee has connected a personal (e.g., non-corporate) device, then the user may receive a lower access level with access to fewer resources (e.g., as compared to the highest access level). After the user is authenticated and the device is authenticated, if the dock determines that a contractor has connected a corporate device to the dock, then the contractor may receive a particular access level while if the contractor has connected a personal (e.g., non-corporate) device, then the user may receive a lower access level with access to fewer resources. After the user is authenticated and the device is authenticated, if the dock determines that a visitor has connected a corporate device to the dock, then the visitor may receive a particular access level while if the visitor has connected a personal (e.g., non-corporate) device, then the user may receive a lower access level with access to fewer resources.

Thus, a dock in a corporate location may include ports that provide access to multiple resources, such as a power supply, a printer, one or more input devices (e.g., mouse, keyboard, and the like), one or more output devices (e.g., display device, virtual reality headset, headphones, speakers, and the like), a network through which networked resources (e.g., servers, databases, and the like) can be accessed, one or more local storage devices, and other types of resources. When a computing device is connected to the dock, the dock may authenticate the computing device, a user that logs in to the computing device, or both. The user may be provided different access levels depending on the user (e.g., employee, contractor, visitor) and the computing device (e.g., corporate device, bring your own device with corporate control, or unknown device). The initial authentication may be between the computing device and the dock. If a policy server is accessible, the dock may obtain a current set of policies. If the policy server is unavailable, a default policy, such as a last used policy, a restricted access policy, or the like may be used. For example, see Table 1.

TABLE 1

|  | Employee | Contractor | Visitor |
| --- | --- | --- | --- |
| Corporate Device | Access Level 1 | Access Level 2 | Access Level 3 |
| BYOD with S/W | Access Level 4 | Access Level 5 | Access Level 6 |
| BYOD w/o S/W | Access Level 7 | Access Level 8 | Access Level 9 |

In Table 1, access level 1 may provide unrestricted access to all available resources, access level 9 may provide access to power, and the remaining access levels 2, 3, 4, 5, 6, 7, and 8 may offer restricted access to some of the available resources. BYOD with S/W indicates a device that is provided by the user (e.g., bring your own device) that has a corporate software application installed to monitor the way in which the BYOD is used. BYOD w/o S/W indicates a device that is provided by the user (e.g., bring your own device) that has does not have any corporate software installed. Thus, BYOD with S/W may provide access to more resources and with fewer restrictions as compared to BYOD w/o S/W. In some cases, the nine access levels may each be different while in other cases, at least some of the nine access levels may be the same (e.g., there may be three different access levels). For example, in a company that has moved to BYOD, a corporate device and a BYOD may have the same access level, with restrictions imposed based on the type of user (e.g., employee, contractor, or visitor) rather than the computing device. To illustrate, the access levels may include (i) unrestricted access to all resources, (ii) unrestricted (e.g., read and write access) access to some resources and restricted access (e.g., read-only access to some resources and no access to other resources) to the remaining resources, (iii) restricted access (e.g., read-only) to some resources, and so on.

As an example, a dock may include (1) an embedded controller and (2) one or more non-transitory computer readable media storing instructions executable by the embedded controller to perform various operations. For example, the operations may include determining that a computing device is connected to the dock. To authenticate the computing device, the operations may include performing an authentication process of credentials associated with the computing device. For example, the authentication process may include receiving, from a dock driver of the computing device, a certificate associated with the computing device and authenticating the certificate. To authenticate a user of the computing device, the operations may include receiving data from an authentication device connected to the computing device and authenticating the data. For example, the data may include one of: biometric data associated with a user (e.g., an employee, a contractor, or a visitor) or a certificate stored on a smartcard presented to (e.g., inserted into or swiped using) the authentication device. The operations may include determining a type of the device. For example, the type may be a corporate provided device or a user provided device (e.g., in a BYOD environment). The operations may include determining a policy based at least in part on the type of the device. For example, determining the policy based on the type of the device may include determining an age of one or more policies stored on the dock, determining that the age satisfies a predetermined threshold, and selecting the policy that is associated with the type of the device. As another example, determining the policy based on the type of the device may include determining an age of one or more policies stored on the dock, determining that the age does not satisfy a predetermined threshold, determining that a policy server is accessible, sending a request to the policy server, receiving a response including one or more updated policies from the policy server, replacing the one or more policies with the one or more updated policies, and selecting an updated policy of the one or more updated policies that is associated with the type of the device. The operations may include determining a dock configuration associated with the policy and configuring one or more ports of the dock according to the dock configuration to enforce the policy. Configuring the one or more ports of the dock according to the dock configuration may include determining a port configuration specified by the dock configuration and configuring a particular port of the one or more ports based on the port configuration. For example, configuring the particular port may include performing at least one of: (i) enabling the particular port, (ii) disabling the particular port, (iii) monitoring data sent and received using the particular port, (iv) modifying (e.g., restricting) an upload speed of the particular port to a particular upload speed specified by the port configuration, (v) modifying (e.g., restricting) a download speed of the particular port to a particular download speed specified by the port configuration, (vi) preventing the particular port from accessing one or more addresses specified by the port configuration, or (vii) preventing the particular port from accessing one or more paths specified by the port configuration. The operations may include providing the computing device with access to one or more resources that are accessible using the one or more ports of the dock. The operations may include determining that a second computing device is connected to the dock, performing a second authentication process of second credentials associated with the second computing device, determining that the second authentication process failed, and selecting one of a default policy, a last used policy, or a restricted access policy. For example, the default policy or the restricted access policy may provide the second computing device with access to power, input device(s) (e.g., mouse, keyboard, and the like), output device(s) (monitors, virtual reality goggles, and the like), and enabling access to an external network (e.g., the Internet) while denying access to a internal (e.g., corporate) network, such as an intranet.

Figure 1:
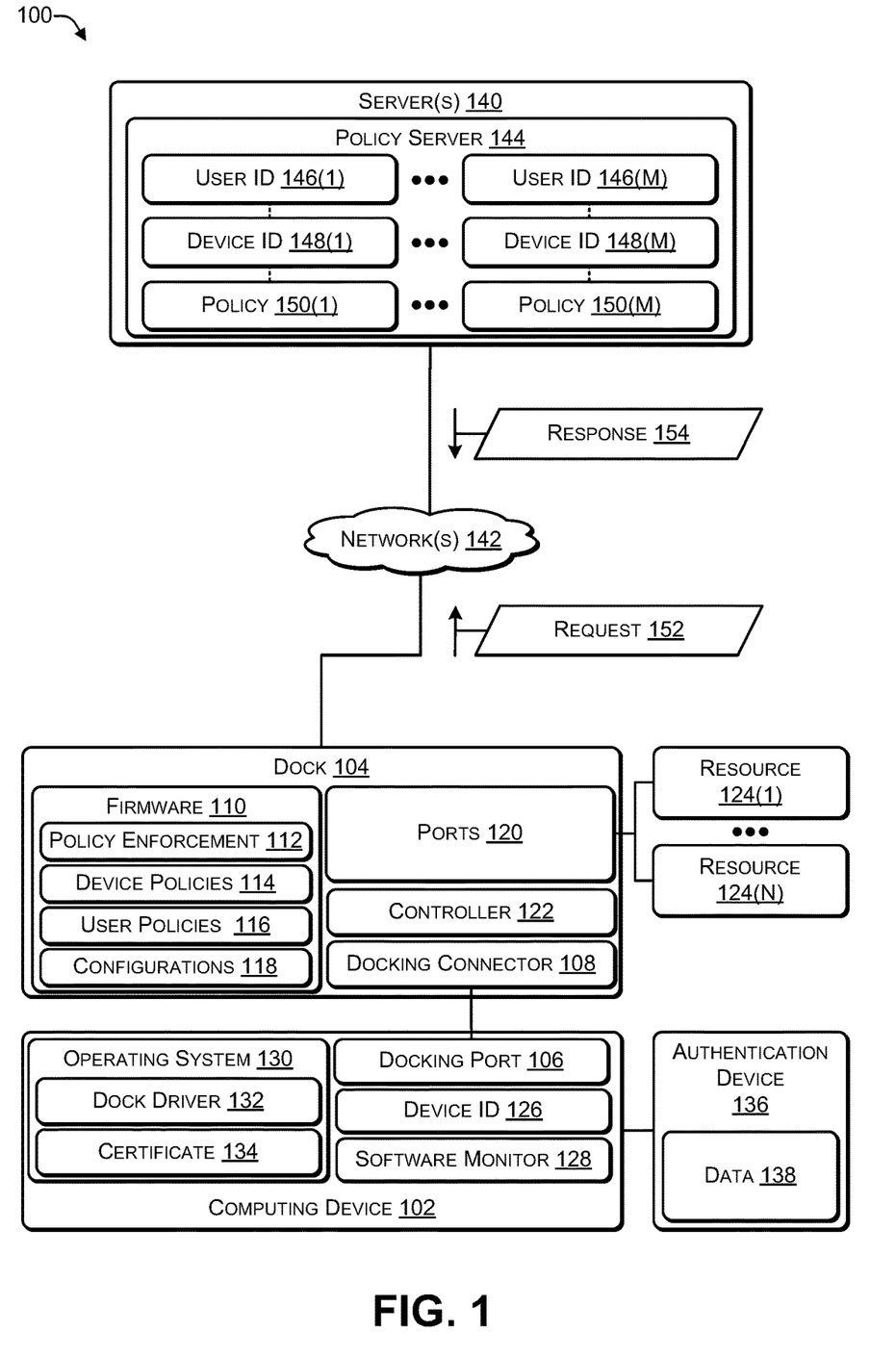
FIG. 1 is a block diagram of a system that includes a computing device connected to a dock, according to some embodiments.

FIG. 1 is a block diagram of a system 100 that includes a computing device connected to a dock, according to some embodiments. A computing device 102 may be connected to a dock 104 by connecting a docking port 106 of the computing device 102 to a docking connector 108 of the dock 104. The docking port 106 and docking connector 108 may together comprise a docking system and may use, for example, Thunderbolt®, universal serial bus (USB), a proprietary system (e.g., Dell® e-port, Apple® lightning, or the like), or another type of docking system.

The dock 104 may include firmware 110 that includes a policy enforcement module 112, one or more device policies 114, one or more user policies, and one or more configurations. The dock 104 may include one or more ports 120, a controller 122, and the docking connector 108. The ports 120 may include, for example, a USB port (e.g., USB 2.0, USB 3.0, USB Type-C, or the like), an Ethernet port, a DisplayPort, a power port (e.g., to receive power from a power supply), a digital video interface (DVI) port, a high definition multimedia interface (HDMI) port, a video graphics adapter (VGA) port, another type of port, or any combination thereof. The ports 120 may be connected to one or more resources, such as a resource 124(1) to a resource 124(N) (where N>0). The resources 124 may include (i) local resources, such as, for example, a power supply, a printer, one or more input devices (e.g., mouse, keyboard, and the like), one or more output devices (e.g., display device, virtual reality headset, headphones, speakers, and the like), one or more local storage devices, and (ii) external resources (e.g., resources accessible over a network, such as a corporate network), such as, for example, servers, databases, other computing devices, network printers, and the like.

The controller 122 may be an embedded controller (e.g., a microcontroller with one or more processor cores) that executes the code stored in the firmware 110. For example, the policy enforcement module 112 may be executed by the controller 122 to authenticate the computing device 102, a user associated with the computing device 102, or both. The device policies 114 may specify a particular policy to use for a particular device or a particular type of device (e.g., corporate device, BYOD, or the like). The user policies may specify a particular policy to use with a particular type of user (e.g., employee, contractor, visitor, or the like). The configurations 118 may include different configurations that the policy enforcement module 112 selects based on authenticating the computing device 102, a user, or both. Each of the configurations 118 may enable one or more of the ports 120, disable one or more of the ports 120, configure one or more of the ports 120 (e.g., enable uploading but not downloading, restrict a download speed, enforce which files can be uploaded or downloaded, or the like), or any combination thereof. For example, a particular policy of the policies 114, 116 may specify that a device, a user, or both are restricted from accessing networked resources. The policy enforcement module 112 may enforce the particular policy by selecting a particular configuration of the configurations 118 (e.g., specified by the particular policy) and configuring the dock 104 accordingly to restrict access to networked resources. For example, to restrict access to networked resources, the particular configuration may: (i) disable an Ethernet port of the ports 120, (ii) prevent the Ethernet port from accessing particular addresses, such as particular internet protocol (IP) addresses, or (iii) reduce an upload speed, a download speed, or both of the Ethernet port.

The computing device 102 may include a device identifier (ID) 126, a software monitor 128, and an operating system 128. The device ID 126 may be an identifier that uniquely identifies the computing device 102, such as, for example, a serial number, a service tag number, or the like. The operating system 130 may include a dock driver 132 and a certificate 134. An authentication device 136 may be connected to (or integrated with) the computing device 102. For example, the authentication device 134 may be a smart card reader, a fingerprint reader, a retinal scanner, an imaging device (e.g., for facial recognition), a signature reader, another type of biometric measurement device, or another type of authentication device.

To authenticate the computing device 102, when the computing device 102 is connected to the dock 104, the dock driver 132 may automatically (e.g., without human interaction) provide the certificate 134 (or the dock 104 may request that the dock driver 132 provide the certificate 134). In addition, or alternately, when the computing device 102 is connected to the dock 104, the dock driver 132 may automatically (e.g., without human interaction) provide the device ID 126 (or the dock 104 may request that the dock driver 132 provide the device ID 126). The dock 104 may attempt to authenticate the certificate 134, the device ID 126, or both and select and apply one of the device policies 114 based on the authentication. For example, if the dock 104 is unable to authenticate the certificate 134, the device ID 126, or both, then one of the device policies 114 that denies access to one or more of the resources 124 may be selected and applied. If the dock 104 is able to authenticate the certificate 134, the device ID 126, or both, then one of the device policies 114 associated with the authenticated computing device 102 may be selected and applied. For example, if the computing device 102 is supplied by a corporation to an employee, then the computing device 102 may be provided with access to the resources 124. If the computing device 102 is not supplied by the corporation (e.g., an unknown device), then the computing device 102 may be provided with limited (or no) access to the resources 124. The computing device 102 may be authenticated using a public key infrastructure (PKI), such as Microsoft® Active Directory. For example, the certificate 134 may be part of a PKI in which the certificate 134 is registered with a registration authority.

To authenticate a user of the computing device 102, when the computing device 102 is connected to the dock 104, the dock driver 132 may automatically (e.g., without human interaction) display (e.g., on a display device of the computing device 102) instructions to the user to enable the dock 104 to capture data 138 (e.g., biometric data, smartcard data, or other credentials) using the authentication device 136. The dock 104 may attempt to authenticate the data 138 and select and apply one of the device policies 114 based on the authentication. For example, if the dock 104 is unable to authenticate the data 138, then one of the device policies 114 that denies access to one or more of the resources 124 may be selected and applied. If the dock 104 is able to authenticate the data 138, then one of the device policies 114 associated with the authenticated user may be selected and applied. For example, depending on whether the user is authenticated as an employee, a contractor, or a visitor, the computing device 102 may be provided with different levels of access to the resources 124. For example, employees may be provided with full access to the resources 124, contractors may be provided with limited access to some of the resources 124 (e.g., some locations on some network accessible servers), and visitors may be provided with extremely limited access to some of the resources 124 (e.g., power, printer, input devices, display devices, and the like).

In a company with a BYOD policy, in some cases, the company may provide a software monitor 128 to install on the computing device 102 (e.g., a BYOD). For example, the software monitor 128 may monitor actions performed by the computing device 102 and periodically send the actions to a corporate server to provide a log of actions performed. The software monitor 128 may monitor and prevent the computing device 102 from performing particular actions (e.g., downloading from particular locations, downloading particular files, or the like). The software monitor may send a report to a corporate server indicating that the particular actions e.g., downloading from particular locations, downloading particular files, or the like) were performed, to enable security personnel to respond. The software monitor 128 may access and provide the certificate 134 to the dock 104 to enable the dock 104 to authenticate the computing device 102. For example, if the computing device 102 has the software monitor 128 installed, then the computing device 102 may be treated as a corporate device and provided with access to the resources 124. If the computing device 102 does not have the software monitor 128 installed, then the computing device 102 may be treated as a non-corporate device and provided with limited (or no) access to the resources 124.

The dock 104 may be connected, through one of the ports 120 (e.g., an Ethernet port), to one or more servers 140 over one or more networks 142. For example, the servers 140 may include a policy server 144 with multiple policies associated with particular users, particular devices, or both. For example, the policy server 144 may include user identifiers (ID) 146(1) to 146(M) (M>0, M not necessarily equal to N). The policy server 144 may include one or more device IDs 148(1) to 148(M). Each device ID 148 may uniquely identify a computing device, such as the representative computing device 102. Each device ID 148 may be a serial number, a service tag, or another unique identifier. Each user ID 146 may be associated with a policy 150. For example, the user ID 146(1) may be associated with the policy 150(1) and the user ID 146(M) may be associated with the policy 150(M). To illustrate, if a user having the user ID 146(M) is authenticated, then the policy 150(M) may be applied. Each device ID 148 may be associated with a policy 150. For example, the device ID 148(1) may be associated with the policy 150(1) and the device ID 148(M) may be associated with the policy 150(M). To illustrate, if a computing device having the device ID 148(M) is authenticated, then the policy 150(M) may be applied. In some cases, the user IDs 146 and device IDs 148 may be used to specify a particular one of the policies 150. For example, if a user having the user ID 146(M) uses a computing device having the device ID 148(M), then the policy 150(M) may be applied.

When the dock 104 detects that the computing device 102 is connected to the dock 104, the dock 104 may determine whether the policies 114, 116 are relatively current or whether the policies 114, 116 are to be updated. For example, the dock 104 may determine a creation date or a date at which the policies 114, 116 were stored and use a current date to determine an age of the policies 114, 116. If the age of the policies 114, 116 satisfies a predetermined threshold (e.g., less than X days old, where X>0), then the dock 104 may use the policies 114, 116.

If the age of the policies 114, 116 does not satisfy the predetermined threshold (e.g., the policies 114, 116 are at least X days old), then the dock 104 may determine if the policy server 144 is accessible (e.g., via the network 142). If the age of the policies 114, 116 does not satisfy the predetermined threshold and the policy server 144 is inaccessible, then the dock 104 may use the policies 114, 116.

If the age of the policies 114, 116 does not satisfy the predetermined threshold and the policy server 144 is accessible, then the dock 104 may send a request 152 for update policies to the policy server 144. In response to receiving the request 152, the policy server 154 may send a response 154. If the polices 114, 116 are current, the response 154 may instruct the dock 104 to use the policies 114, 116. If at least one of the polices 114, 116 is not current (e.g., out of date), then the response 154 may include one or more of the policies 150. The dock 104 may receive the response 154 and replace at least a portion of the policies 114, 116 with one or more of the policies 150 included in the response 154.

The policy enforcement module 112 may determine whether the dock 104 is configured to authenticate the computing device 102, authenticate the user, or both. For example, a system administrator may set a setting in the firmware 110 instructing the policy enforcement module 112 whether to authenticate the computing device 102, the user, or both. If the dock 104 is configured to authenticate both the computing device 102 and the user, the dock 104 may, in some cases, authenticate the computing device 102 before authenticating the user.

To authenticate the computing device 102, the policy enforcement module 112 may attempt to authenticate the certificate 134, the device ID 126, the software monitor 128, or any combination thereof and select and apply one of the device policies 114 based on the authentication. If the dock 104 is unable to authenticate a particular combination of the certificate 134, the device ID 126, and the software monitor 128, then one of the device policies 114 that denies access to one or more of the resources 124 may be selected and applied. If the dock 104 is able to authenticate the particular combination of the certificate 134, the device ID 126, and the software monitor 128, then one of the device policies 114 associated with the authenticated computing device 102 may be selected.

To authenticate a user of the computing device 102, the policy enforcement module 112 may automatically display instructions to the user to provide the biometric data 138 using the authentication device 136. The dock 104 may attempt to authenticate the data 138 and select and apply one of the device policies 114 based on the authentication. For example, if the dock 104 is unable to authenticate the data 138, then one of the device policies 114 that denies access to one or more of the resources 124 may be selected and applied. If the dock 104 is able to authenticate the data 138, then one of the device policies 114 associated with the authenticated user may be selected.

The policy enforcement module 112 may enforce the selected policy by selecting a particular configuration of the configurations 118 (e.g., specified by the particular policy) and configuring the dock 104 accordingly to provide (and/or restrict) access to one or more of the resources 124. For example, to restrict access to resources, the particular configuration may: (i) disable one or more of the ports 120, (ii) prevent one or more of the ports 120 from accessing particular addresses, such as particular internet protocol (IP) addresses, or particular locations specified using network paths, or (iii) reduce an upload speed, a download speed, or both of the one or more of the ports 120. To illustrate, to restrict access to network-accessible resources, the particular configuration may: (i) disable a particular (e.g., Ethernet) port of the ports 120 that enables access to a network, (ii) prevent the particular port from accessing particular IP addresses, particular locations, or the like, or (iii) reduce an upload speed, a download speed, or both of the particular port.

Thus, when a dock detects that a computing device has been attached to the dock, the dock may authenticate the computing device, a user of the computing device, or both. Based on the authentication, the dock may select a particular policy. The dock may identify a configuration associated with the particular policy and configure the dock according to the configuration. For example, the configuration may enable or disable one or more ports of the dock to enable the computing device to access one or more resources that are accessible via the ports. For example, the configuration may determine which particular resources are accessible to the computing device, conditions placed on accessing the particular resources (e.g., accessible locations, inaccessible locations, upload speeds, download speeds, and the like), which resources are inaccessible, and the like.

Figure 2:
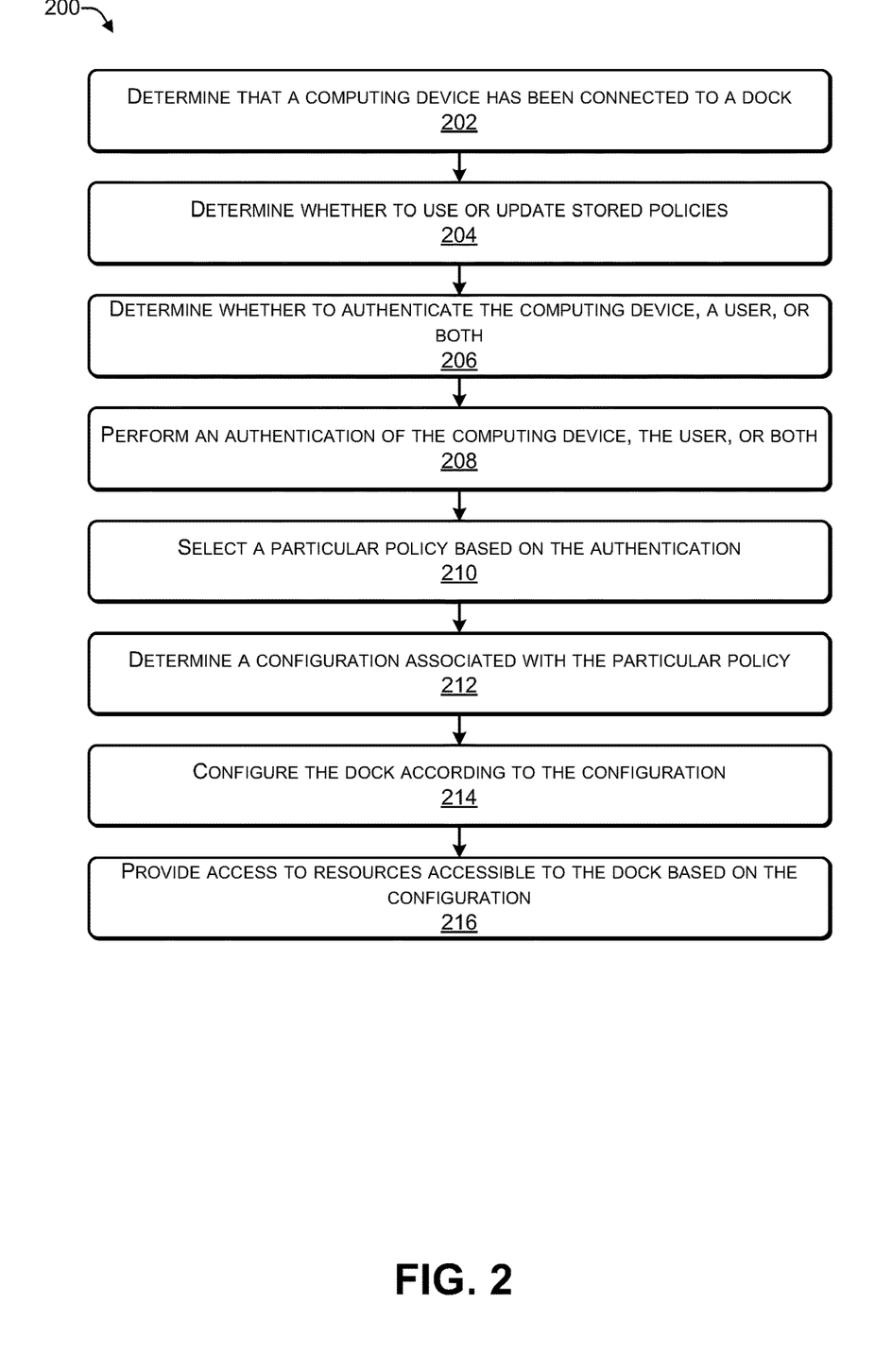
FIG. 2 is a flowchart of a process that includes configuring a dock according to a policy, according to some embodiments.
Figure 3:
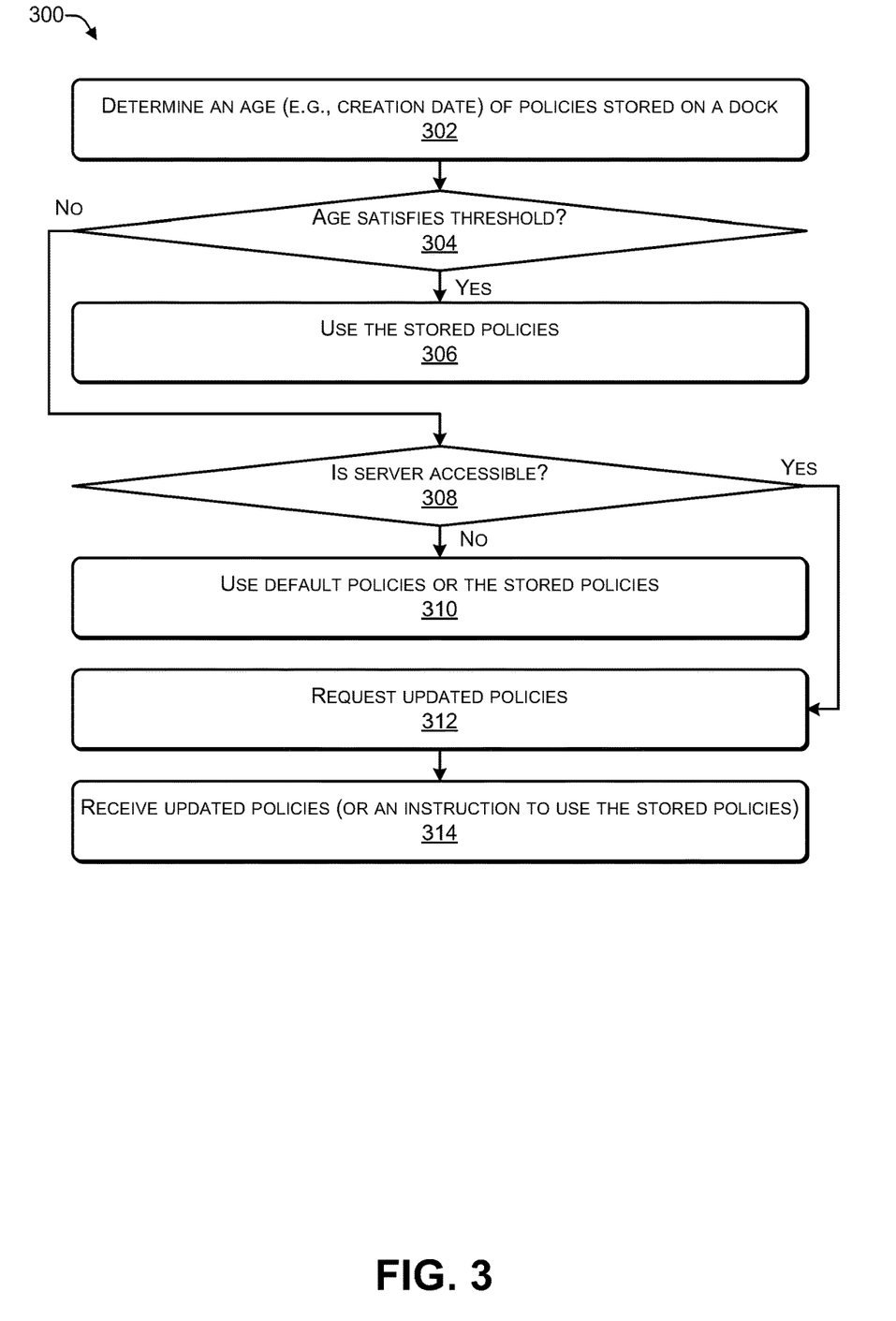
FIG. 3 is a flowchart of a process that includes requesting a current policy, according to some embodiments.

In the flow diagram of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300, are described with reference to FIG. 1 as described above, although other models, frameworks, systems and environments may be used to implement these processes.

FIG. 2 is a flowchart of a process 200 that includes configuring a dock according to a policy, according to some embodiments. The process 200 may be performed by the dock 104 of FIG. 1.

At 202, the process may determine that a computing device has been connected to the dock. At 204, the process may determine whether to use stored policies or whether to update the stored policies. For example, in FIG. 1, the dock 104 may detect that the computing device 102 is connected to the dock 104 and determine whether the policies 114, 116 or relatively current or whether the policies 114, 116 are to be updated. A more detailed description of 204 is provided in FIG. 3 and the accompanying description.

At 206, the process may determine whether to authenticate the computing device, a user of the computing device, or both. At 208, the process may perform an authentication of the computing device, a user of the computing device, or both. At 210, a particular policy may be selected based on the authentication. For example, in FIG. 1, the dock 104 may be configured, e.g., by a system administrator, to authenticate the computing device 102, authenticate the user, or both. To authenticate the computing device 102, the policy enforcement module 112 may attempt to authenticate the certificate 134, the device ID 126, the software monitor 128, or any combination thereof and select and apply one of the device policies 114 based on the authentication. If the dock 104 is unable to authenticate a particular combination of the certificate 134, the device ID 126, and the software monitor 128, then one of the device policies 114 that denies access to one or more of the resources 124 may be selected and applied. If the dock 104 is able to authenticate the particular combination of the certificate 134, the device ID 126, and the software monitor 128, then one of the device policies 114 associated with the authenticated computing device 102 may be selected. To authenticate a user of the computing device 102, the policy enforcement module 112 may automatically display instructions to the user to provide the biometric data 138 using the authentication device 136. The dock 104 may attempt to authenticate the data 138 and select and apply one of the device policies 114 based on the authentication. For example, if the dock 104 is unable to authenticate the data 138, then one of the device policies 114 that denies access to one or more of the resources 124 may be selected and applied. If the dock 104 is able to authenticate the data 138, then one of the device policies 114 associated with the authenticated user may be selected.

At 212, the process may determine (e.g., identify or select) a configuration associated with the particular policy. At 214, the process may configure the dock according to the configuration. At 216, based on the configuration, the dock may provide access to resources that are accessible via the dock. For example, in FIG. 1, the dock 104 may enforce a selected policy of the policies 114, 116 by selecting a particular configuration of the configurations 118 (e.g., as specified by the selected policy) and configuring the dock 104 accordingly to provide (and/or restrict) access to one or more of the resources 124. For example, to restrict access to particular resources of the resources 124, the particular configuration may: (i) disable one or more of the ports 120 through which the particular resources are accessed, (ii) prevent the port from accessing particular locations (e.g., IP addresses, file paths, and other types of locations), or (iii) modify (e.g., reduce) an upload speed, a download speed, or both of one or more of the ports 120.

Thus, when a dock detects that a computing device has been attached to the dock, the dock may authenticate the computing device, a user of the computing device, or both. Based on the authentication, the dock may select a particular policy. The dock may identify a configuration associated with the particular policy and configure the dock according to the configuration. For example, the configuration may enable or disable one or more ports of the dock to enable the computing device to access one or more resources that are accessible via the ports. For example, the configuration may determine which particular resources are accessible to the computing device, conditions placed on accessing the particular resources (e.g., accessible locations, inaccessible locations, upload speeds, download speeds, and the like), which resources are inaccessible, and the like. In this way, for example, an employee may be provided with access to all resources accessible via the ports of the dock, a contractor may be provided with access (e.g., in some cases restricted access) to some (but not all) of the resources accessible via the ports of the dock, and a visitor may be provided with access (e.g., in some cases restricted access) to a limited number of resources accessible via the ports of the dock. As another example, a corporate supplied computing device may be provided with access to the resources accessible via the ports of the dock, a computing device (e.g., BYOD) with corporate monitoring software may be provided with access to the resources accessible via the ports of the dock, and an unknown computing device (e.g., not provided by the corporation and does not include corporate monitoring software) may be provided with access (e.g., in some cases restricted access) to a limited number of resources accessible via the ports of the dock.

FIG. 3 is a flowchart of a process 300 that includes requesting a current policy, according to some embodiments. The process 300 may be performed by the dock 104 of FIG. 1. The process 300 illustrates how the dock 104 determines whether to use stored policies or whether to update the stored policies.

At 302, the process may determine an age of policies stored on a dock. At 304, the process may determine whether the age of the policies satisfies a predetermined threshold (e.g., less than X days, X>0). If the process determines, at 304, that "yes" the age of the policies satisfies the predetermined threshold, then the process may select (e.g., use) the stored policies, at 306. For example, in FIG. 1, after the dock 104 detects that the computing device 102 is connected to the dock 104, the dock 104 may determine whether the policies 114, 116 are current or whether the policies 114, 116 are to be updated. For example, the dock 104 may determine a creation date or a date at which the policies 114, 116 were stored and use a current date to determine an age of the policies 114, 116. If the age of the policies 114, 116 satisfies a predetermined threshold (e.g., less than X days old, where X>0), then the dock 104 may use the policies 114, 116.

If the process determines, at 304, that "no" the age of the policies does not satisfy the predetermined threshold, then the process may proceed to 308. At 308, the process may determine if a policy server is accessible. If the process determines, at 308, that "no" the policy server is inaccessible, then one or more default policies may be selected (e.g., used), at 310. For example, in FIG. 1, if the age of the policies 114, 116 does not satisfy the predetermined threshold (e.g., the policies 114, 116 are at least X days old), then the dock 104 may determine if the policy server 144 is accessible (e.g., via the network 142). If the age of the policies 114, 116 does not satisfy the predetermined threshold and the policy server 144 is inaccessible, then the dock 104 may use a default one of the policies 114, 116 (e.g., a default device policy or a default user policy). In some cases, the default policy may be a last used policy.

If the process determines, at 308, that "yes" the policy server is accessible, then the process may proceed to 312, where the process sends a message requesting the latest policies to the policy server. At 314, the process may receive a response from the policy server. The response may include a latest set of policies or an instruction to use the stored policies. For example, in FIG. 1, if the age of the policies 114, 116 does not satisfy the predetermined threshold and the policy server 144 is accessible, then the dock 104 may send a request 152 (e.g., requesting updated policies) to the policy server 144. In response to receiving the request 152, the policy server 154 may send a response 154. If the polices 114, 116 are current, the response 154 may instruct the dock 104 to use the policies 114, 116. If at least one of the polices 114, 116 is not current (e.g., out of date), then the response 154 may include one or more of the policies 150. The dock 104 may receive the response 154 and replace at least a portion of the policies 114, 116 with one or more of the policies 150 included in the response 154.

Thus, when a dock detects that a computing device has been connected to the dock, the dock may determine whether an age of the stored policies. If the stored policies are not old (e.g., less than a threshold amount of days old) then the stored policies may be used. If the stored policies are old and are to be updated but the policy server is inaccessible, then the stored policies may be used. If the stored policies are old and the policy server is accessible, then the dock may send a request to the policy server to send updated policies. The dock may receive a response from the policy server. If the response from the policy server includes updated policies, then the dock may replace one or more of the stored policies with the updated policies. If the response from the policy server includes an instruction to use the stored policies (e.g., the stored policies are the most current policies), then the dock may use the stored policies.

Figure 4:
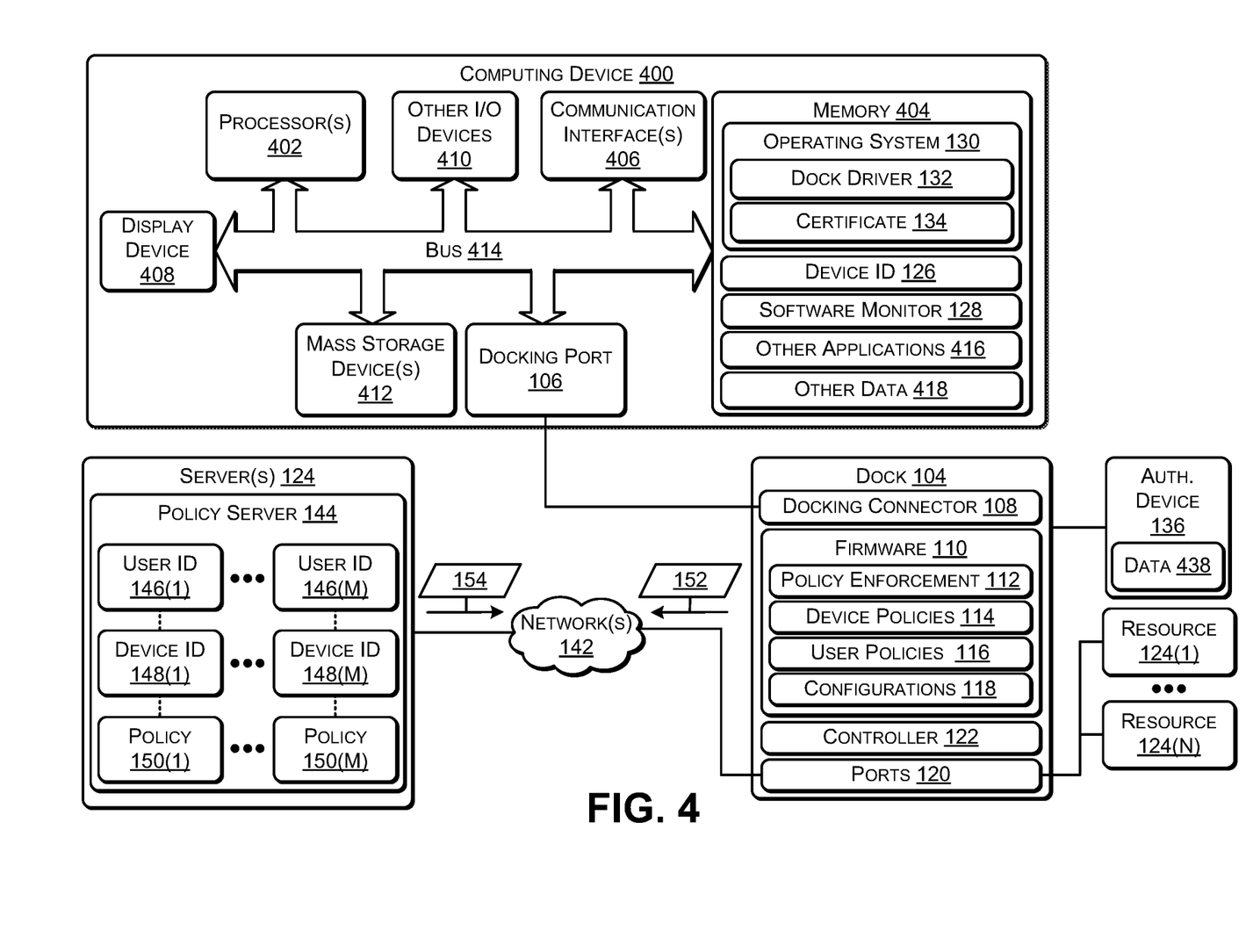
FIG. 4 illustrates an example configuration of a computing device that can be used to implement the systems and techniques described herein.

FIG. 4 illustrates an example configuration of a computing device 400 that can be used to implement the systems and techniques described herein, such as, for example, the servers 124, the dock 104, or the computing device 102 of FIG. 1. In FIG. 4, the computing device 400 is shown implementing the computing device 102 of FIG. 1. The computing device 102 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106 (e.g., when the computing device 400 is connected to the dock 104). The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

In the case where the computing device 800 is used to implement the dock 104(N), the processors 402 may include an embedded controller (e.g., a microcontroller or embedded logic device) and the mass storage device 412 may include firmware (e.g., read only memory (ROM)).

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth. The computer storage media, such as memory 116 and mass storage devices 412, may be used to store software and data, such as, for example, the operating system 130, the device ID 126, the software monitor 128, other applications 416, and other data 418.

Thus, when the dock 104 detects that the computing device 400 has been attached to the dock 104, the dock 104 may authenticate the computing device 400, a user of the computing device 400, or both. For example, the user may be authenticated by obtaining biometric data 438 using the authentication device 136, by the user presenting a smartcard or other credentials to the authentication device 136, or the like. Based on the authentication, the dock 104 may select a particular policy of the policies 114, 116. The dock 104 may identify a particular configuration of the configurations 118 associated with the particular policy and configure the dock 104 according to the particular configuration. For example, the particular configuration may enable or disable one or more of the ports 120 of the dock 104 to enable the computing device 400 to access the resources 124 and network accessible resources 125 that are accessible via the ports. Dome of the resources 124 may be accessible via the network 142. The particular configuration may determine which of the resources 124 are accessible to the computing device 400, conditions placed on accessing the resources 124 (e.g., accessible locations, inaccessible locations, upload speeds, download speeds, and the like), which of the resources 124 are inaccessible, and the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
providing a first computing device having a hardware data bus connector and an embedded controller connected together in data communication inside the first computing device;
determining, by the embedded controller of the first computing device that a data communication port inside a separate second computing device is connected in data communication with the hardware data bus connector of the first computing device by a hardware data bus;
performing, by the embedded controller, an authentication process of credentials associated with the second computing device, wherein performing the authentication process of the credentials associated with the second computing device comprises authenticating, by the embedded controller, at least one of a certificate, a device identifier (ID), or a software monitor associated with the second computing device;
determining, by the embedded controller, a type of the second computing device;
determining, by the embedded controller, a policy based at least in part on the type of the second computing device;
determining, by the embedded controller, a first configuration for the first computing device, the first configuration being associated with the policy;
configuring, by the embedded controller, data communication capability or data monitoring of one or more data communication ports inside the first computing device that are coupled to send and receive data through the one or more data communication ports inside the first computing device according to the first configuration; and
providing the second computing device with access to one or more resources, by the first computing device having the first configuration, wherein the one or more resources are separate from the first computing device and are accessible through the one or more data communication ports that are inside the first computing device.

2. The method of claim 1, further comprising executing an operating system including a software driver for the first computing device on the second computing device; and wherein performing the authentication process of the credentials associated with the second computing device comprises:
receiving, from the software driver of the operating system, a certificate associated with the second computing device;
authenticating, by the embedded controller, the certificate; and
where the determining a policy further comprises selecting the policy based in part on the results of the authenticating.

3. The method of claim 1, wherein the type of second computing device comprises one of:
a corporation-provided computing device; or
a user-provided computing device.

4. The method of claim 1, wherein determining the policy based on the type of the second computing device comprises:
determining an age of one or more policies stored on the first computing device;
determining that the age satisfies a predetermined threshold; and
selecting the policy that is associated with the type of the second computing device.

5. The method of claim 1, further comprising:
receiving data from an authentication device connected to the second computing device, wherein the data comprises one of:
biometric data associated with a user, wherein the user comprises one of an employee, a contractor, or a visitor; or
a certificate stored on a smartcard presented to the authentication device; and
authenticating the data.

6. The method of claim 1, where the one or more data communication ports of the first computing device comprise at least one of a USB port, an Ethernet port, a DisplayPort, a digital video interface (DVI) port, a high definition multimedia interface (HDMI) port, or a video graphics adapter (VGA) port.

7. The method of claim 1, where the second computing device is a laptop or tablet computer.

8. The method of claim 1, where the one or more resources comprise at least one local resource coupled to at least one data communication port of the first computing device by a hardware data bus sending and receiving data between the at least one local resource and the at least one data communication port; and where the at least one local resource comprises a power supply, a printer, a mouse, a keyboard, a display device, a virtual reality headset, a headphone, a speaker, or a local storage device.

9. The method of claim 1, where the one or more resources comprise at least one external resource coupled to at least one data communication port of the first computing device by a network sending and receiving data between the at least one external resource and the at least one data communication port; and where the at least one external resource comprises a server or a network computer.

10. A method comprising:
    determining, by an embedded controller of a dock, that a computing device is connected to the dock;
    performing, by the embedded controller, an authentication process of credentials associated with the computing device;
    determining, by the embedded controller, a type of the computing device;
    determining, by the embedded controller, a policy based on the type of the computing device;
    determining, by the embedded controller, a dock configuration associated with the policy;
    configuring, by the embedded controller, one or more ports of the dock according to the dock configuration; and
    providing the computing device with access to one or more resources, by the dock having the dock configuration, wherein the one or more resources are accessible using the one or more ports of the dock;
    wherein configuring the one or more ports of the dock according to the dock configuration comprises:
        determining a port configuration specified by the dock configuration; and
        configuring a particular port of the one or more ports based on the port configuration; and
    wherein configuring the particular port comprises at least one of:
        enabling the particular port;
        disabling the particular port;
        monitoring data sent and received using the particular port;
        modifying an upload speed of the particular port to a particular upload speed specified by the port configuration;
        modifying a download speed of the particular port to a particular download speed specified by the port configuration;
        preventing the particular port from accessing one or more addresses specified by the port configuration; or
        preventing the particular port from accessing one or more paths specified by the port configuration.

11. A method comprising:
    determining, by an embedded controller of a dock, that a computing device is connected to the dock;
    performing, by the embedded controller, an authentication process of credentials associated with the computing device;
    determining, by the embedded controller, a type of the computing device;
    determining, by the embedded controller, a policy based on the type of the computing device;
    determining, by the embedded controller, a dock configuration associated with the policy;
    configuring, by the embedded controller, one or more ports of the dock according to the dock configuration; and
    providing the computing device with access to one or more resources, by the dock having the dock configuration, wherein the one or more resources are accessible using the one or more ports of the dock;
    wherein determining the policy based on the type of the computing device comprises:
        determining an age of one or more policies stored on the dock;
        determining that the age does not satisfy a predetermined threshold;
        determining that a policy server is accessible;
        sending a request to the policy server;
        receiving a response comprising one or more updated policies from the policy server;
        replacing the one or more policies with the one or more updated policies; and
        selecting an updated policy of the one or more updated policies that is associated with the type of the computing device.

12. A first computing device comprising:
    an embedded controller connected in data communication with a hardware data bus connector inside the first computing device; and
    one or more non-transitory computer readable media storing instructions executable by the embedded controller to perform operations comprising:
        determining that a data communication port inside a separate second computing device is connected in data communication with the hardware data bus connector of the first computing device by a hardware data bus sending and receiving data across the data bus between the hardware data bus connector of the first computing device and the data communication port of the second computing device;
        performing an authentication process of credentials associated with the second computing device, wherein performing the authentication process of the credentials associated with the second computing device comprises authenticating, by the embedded controller, at least one of a certificate, a device identifier (ID), or a software monitor associated with the second computing device;
        determining a type of the second computing device;
        determining a policy based at least in part on the type of the second computing device;
        determining a first configuration for the first computing device, the first configuration being associated with the policy;
        configuring data communication capability or data monitoring of one or more data communication ports inside the first computing device that are coupled to send and receive data through the one or more data communication ports inside the first computing device according to the first configuration determined for the first computing device; and
        providing the second computing device with access to one or more resources separate from the first computing device that are separate from the first computing device and that are accessible through the one or more data communication ports that are inside the first computing device.

13. The first computing device of claim 12, wherein performing the authentication process of the credentials associated with the second computing device comprises:
    receiving, from a software driver of the operating system, a certificate associated with the second computing device;
    authenticating the certificate; and
    where the determining a policy further comprises selecting the policy based in part on the results of the authenticating.

14. The first computing device of claim 12, further comprising one or more non-transitory computer readable media storing instructions executable by the embedded controller to perform operations comprising:
- determining that a third computing device is connected to the first computing device;
- performing a second authentication process of second credentials associated with the third computing device;
- determining that the second authentication process failed; and
- selecting one of a default policy, a last used policy, or a restricted access policy for the third computing device.

15. The first computing device of claim 12, wherein determining the policy based on the type of the first computing device comprises:
- determining an age of one or more policies stored on the first computing device;
- determining that the age satisfies a predetermined threshold; and
- selecting the policy that is associated with the type of the first computing device.

16. The first computing device of claim 12, wherein the operations further comprise:
- receiving data from an authentication device connected to the second computing device, wherein the data comprises one of:
  - biometric data associated with a user, wherein the user comprises one of an employee, a contractor, or a visitor; or
  - a certificate stored on a smartcard presented to the authentication device; and
- authenticating the data.

17. The first computing device of claim 14, where the determining a policy based at least in part on the type of the second computing device comprises determining a first policy that provides unrestricted access to all of the one or more resources that are available, and where the providing the second computing device with access to one or more resources comprises providing the second computing device with access to all of the one or more resources that are available; and where the selecting one of a default policy, a last used policy, or a restricted access policy for the third computing device further comprises providing the third computing device with access to only a first portion of the one or more resources that are available and denying the third computing device access to a second portion of the one or more resources that are available.

18. The first computing device of claim 17, where the providing the second computing device with access to all of the one or more resources that are available comprises providing the second computing device with access to a network; and where the denying the third computing device access to a second portion of the one or more resources that are available comprises denying the third computing device access to the network.

19. A dock comprising:
an embedded controller; and
one or more non-transitory computer readable media storing instructions executable by the embedded controller to perform operations comprising:
- determining that a computing device is connected to the dock;
- performing an authentication process of credentials associated with the computing device;
- determining a type of the computing device;
- determining a policy based at least in part on the type of the computing device;
- determining a dock configuration associated with the policy;
- configuring one or more ports of the dock according to the dock configuration; and
- providing the computing device with access to one or more resources that are accessible using the one or more ports of the dock;

wherein configuring the one or more ports of the dock according to the dock configuration comprises:
- determining a port configuration specified by the dock configuration; and
- configuring a particular port of the one or more ports based on the port configuration; and wherein configuring the particular port comprises at least one of:
- enabling the particular port;
- disabling the particular port;
- monitoring data sent and received using the particular port;
- modifying an upload speed of the particular port to a particular upload speed specified by the port configuration;
- modifying a download speed of the particular port to a particular download speed specified by the port configuration;
- preventing the particular port from accessing one or more addresses specified by the port configuration; or
- preventing the particular port from accessing one or more paths specified by the port configuration.

20. A dock comprising:
an embedded controller; and
one or more non-transitory computer readable media storing instructions executable by the embedded controller to perform operations comprising:
- determining that a computing device is connected to the dock;
- performing an authentication process of credentials associated with the computing device;
- determining a type of the computing device;
- determining a policy based at least in part on the type of the computing device;
- determining a dock configuration associated with the policy;
- configuring one or more ports of the dock according to the dock configuration; and
- providing the computing device with access to one or more resources that are accessible using the one or more ports of the dock;

wherein determining the policy based on the type of the computing device comprises:
- determining an age of one or more policies stored on the dock;
- determining that the age does not satisfy a predetermined threshold;
- determining that a policy server is accessible;
- sending a request to the policy server;
- receiving a response comprising one or more updated policies from the policy server;
- replacing the one or more policies with the one or more updated policies; and
- selecting an updated policy of the one or more updated policies that is associated with the type of the computing device.

21. One or more non-transitory computer readable media storing instructions executable by an embedded controller of a first computing device to perform operations comprising:
  determining that a data communication port inside a separate second computing device is connected in data communication with a hardware data bus connector of the first computing device by a hardware data bus sending and receiving data across the data bus between the hardware data bus connector of the first computing device and the data communication port of the second computing device;
  performing an authentication process of credentials associated with the second computing device, wherein performing the authentication process of the credentials associated with the second computing device comprises authenticating, by the embedded controller, at least one of a certificate, a device identifier (ID), or a software monitor associated with the second computing device;
  determining a type of the second computing device;
  determining a policy based at least in part on the type of the second computing device;
  determining a first configuration for the first computing device, the first configuration being associated with the policy;
  configuring data communication capability or data monitoring of one or more data communication ports inside the first computing device that are coupled to send and receive data through the one or more data communication ports inside the first computing device according to the first configuration determined for the first computing device; and
  providing the second computing device with access to one or more resources that are separate from the first computing device and that are accessible through the one or more data communication ports that are inside the first computing device.

22. The one or more non-transitory computer readable media of claim 21, wherein performing the authentication process of the credentials associated with the second computing device comprises:
  receiving, from a software drive of an operating system executing on the second computing device, a certificate associated with the second computing device;
  authenticating the certificate; and
  where the determining a policy further comprises selecting the policy based in part on the results of the authenticating.

23. The one or more non-transitory computer readable media of claim 21, wherein determining the policy based on the type of the second computing device comprises:
  determining an age of one or more policies stored on the first computing device;
  determining that the age satisfies a predetermined threshold; and
  selecting the policy that is associated with the type of the second computing device.

24. The one or more non-transitory computer readable media of claim 21, wherein the operations further comprise:
  receiving data from an authentication device connected to the second computing device, wherein the data comprises one of:
    biometric data associated with a user, wherein the user comprises one of an employee, a contractor, or a visitor; or
    a certificate stored on a smartcard presented to the authentication device; and
  authenticating the data.

25. One or more non-transitory computer readable media storing instructions executable by an embedded controller of a dock to perform operations comprising:
  determining that a computing device is connected to the dock;
  performing an authentication process of credentials associated with the computing device;
  determining a type of the computing device;
  determining a policy based on the type of the computing device;
  determining a dock configuration associated with the policy;
  configuring one or more ports of the dock according to the dock configuration; and
  providing the computing device with access to one or more resources that are accessible using the one or more ports of the dock;
  wherein configuring the one or more ports of the dock according to the dock configuration comprises:
    determining a port configuration specified by the dock configuration; and
    configuring a particular port of the one or more ports based on the port configuration, wherein configuring the particular port comprises at least one of:
      enabling the particular port;
      disabling the particular port;
      monitoring data sent and received using the particular port;
      modifying an upload speed of the particular port to a particular upload speed specified by the port configuration;
      modifying a download speed of the particular port to a particular download speed specified by the port configuration;
      preventing the particular port from accessing one or more addresses specified by the port configuration; or
      preventing the particular port from accessing one or more paths specified by the port configuration.

26. One or more non-transitory computer readable media storing instructions executable by an embedded controller of a dock to perform operations comprising:
  determining that a computing device is connected to the dock;
  performing an authentication process of credentials associated with the computing device;
  determining a type of the computing device;
  determining a policy based on the type of the computing device;
  determining a dock configuration associated with the policy;
  configuring one or more ports of the dock according to the dock configuration; and
  providing the computing device with access to one or more resources that are accessible using the one or more ports of the dock;
  wherein determining the policy based on the type of the computing device comprises:
    determining an age of one or more policies stored on the dock;
    determining that the age does not satisfy a predetermined threshold;
    determining that a policy server is accessible;
    sending a request to the policy server;
    receiving a response comprising one or more updated policies from the policy server;

replacing the one or more policies with the one or more updated policies; and selecting an updated policy of the one or more updated policies that is associated with the type of the computing device.

* * * * *